UNITED STATES PATENT OFFICE.

THOMAS B. ALLEN, OF NIAGARA FALLS, NEW YORK, ASSIGNOR TO THE CARBORUNDUM COMPANY, OF NIAGARA FALLS, NEW YORK, A CORPORATION OF PENNSYLVANIA.

COMPOSITION OF MATTER CONTAINING BERYLLIA AND ALUMINA.

1,001,571.     Specification of Letters Patent.     Patented Aug. 22, 1911.

No Drawing.     Application filed November 9, 1910. Serial No. 591,495.

*To all whom it may concern:*

Be it known that I, THOMAS B. ALLEN, of Niagara Falls, Niagara county, in the State of New York, have invented a new and useful Composition of Matter Containing Beryllia and Alumina, of which the following is a full, clear, and exact description.

My invention is designed to provide a new and useful composition of matter containing oxids of aluminum and beryllium. The composition is of a crystalline nature and forms abrasive grains which are valuable for abrasive and other purposes.

In the manufacture of the new product, I preferably melt a mixture containing the oxids of aluminum and beryllium in an electric furnace, such, for example, as shown in United States Patent No. 929,517, granted to F. J. Tone on July 27th, 1909. This furnace is of the arc type with vertical electrodes depending into its crucible; and the oxid mixture may be gradually fed into the furnace around the electrodes during passage of the electric current, until the furnace is filled with the melted mixture to any desirable amount. The current is then turned off and the material allowed to cool; when the ingot may be removed from the furnace and crushed into grains of various sizes, such as are used for abrasive purposes.

Instead of using a mixture of the oxids of aluminum and beryllium, I may use any ore or ores or minerals as a source of either or both of these materials. Thus, as a source of alumina I may use an ore or mineral, such as bauxite, which may contain in addition to alumina other materials such as oxids of iron, silicon, and titanium. As a source of beryllia, any natural ore may be employed containing this substance, and also containing other materials such as oxids of aluminum, silicon, iron, &c. I prefer to use bauxite as a source of alumina, and the mineral known as beryl as a source of beryllia; though I do not wish to limit myself to any particular material containing such oxids.

The mixture of bauxite and beryl is preferably made up with a sufficient amount of carbon or other reducing material, to remove the major portion of the oxid of iron and of the oxid of silicon. It is also preferable to add to the mixture, oxid of iron or some other basic metallic oxid, in order to more readily remove the reduced silicon and titanium.

As an example of my preferred method, I have melted together a mixture of 100 parts calcined bauxite, 75 parts beryl, 50 parts oxid of iron, and 12 parts of coke in an electric furnace, these proportions being by weight, and after melting and reduction have obtained a product containing $7\frac{1}{2}$ per cent. of beryllia and 89 per cent. of alumina, the remainder consisting mainly of the oxid of iron, silicon and titanium. The beryllia should be present, to less than eighteen per cent., that is, less than that represented by the chemical formula $BeOAl_2O_3$. If such per cent. of beryllia is exceeded, an excess is present which would either crystallize out as beryllia or form beryllium aluminate of less hardness. In this reducing operation there is practically no reduction of oxid of aluminum or oxid of beryllium, since the heat of formation of these oxids is higher than that of the other oxids present.

The amount of silica and other oxids remaining in the product will depend upon the amount of oxid of iron and of carbonaceous material added. The alloy consisting of iron, silicon and titanium formed by reducing the impurities in the melted mixture may be separated from the desired product either during or after the furnace operation. Mechanical, electrical, or chemical means may be used for this separation after the fused mass is removed from the furnace.

The abrasive qualities of the product vary with the content of beryllia and other oxids; and by varying the composition and proportions I can prepare a number of products of differing degrees of hardness and toughness. The content of beryllia gives to the product an improved crystallization; while the toughness of the product decreases as the amount of beryllia is increased. The hardness of the product, however, increases as the amount of contained beryllia is increased.

The mixture of the charge may be varied, any desirable form of furnace may be employed, and many other changes may be made without departing from my invention.

I claim:—

1. As a new composition of matter, a homogeneous crystalline product containing alumina and also containing beryllia to not exceed eighteen per cent.

2. As a new article of manufacture, a homogeneous crystalline product consisting of alumina, and beryllia substantially free from impurities, and containing not to exceed eighteen per cent. beryllia.

3. As a new article of manufacture, a homogeneous crystalline product consisting of alumina and beryllia, the proportion of beryllia being less than that represented by the chemical formula $BeOAl_2O_3$.

4. The process of forming the herein described product which consists of melting by electrically developed heat a mixture containing alumina, beryllia and carbon, substantially reducing the impurities, allowing the fluid mass to cool, and separating the crystalline product from the impurities.

5. The process of forming the herein-described product, which consists of melting by electrically developed heat a mixture containing alumina, beryllia, and a reducing agent, substantially reducing the impurities, allowing the fluid mass to cool, and separating the crystalline product from the impurities.

In testimony whereof, I have hereunto set my hand.

THOS. B. ALLEN.

Witnesses:
L. B. COULTER,
C. S. GREENWOOD.